United States Patent
Sarashina (10) Patent No.: US 9,094,150 B2
(45) Date of Patent: Jul. 28, 2015

(54) METHOD FOR REGISTERING OPTICAL NETWORK UNIT IN TELECOMMUNICATIONS NETWORK AND OPTICAL NETWORK UNIT THEREFOR

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 39 days.

(21) Appl. No.: 14/134,132

(22) Filed: Dec. 19, 2013

(65) Prior Publication Data
US 2014/0270775 A1 Sep. 18, 2014

(30) Foreign Application Priority Data

Mar. 18, 2013 (JP) ................. 2013-054815

(51) Int. Cl.
*H04J 14/00* (2006.01)
*H04J 14/02* (2006.01)
*H04Q 11/00* (2006.01)

(52) U.S. Cl.
CPC ......... *H04J 14/0234* (2013.01); *H04J 14/0256* (2013.01); *H04J 14/0282* (2013.01); *H04Q 11/0067* (2013.01); *H04J 14/0238* (2013.01); *H04Q 2011/0086* (2013.01)

(58) Field of Classification Search
CPC . H04J 14/0227; H04J 14/0228; H04J 14/023; H04J 14/0232; H04J 14/0234; H04J 14/0235; H04J 14/0236; H04J 14/0238; H04J 14/0242; H04J 14/0245; H04J 14/0246; H04J 14/0247; H04J 14/0249; H04J 14/025; H04J 14/0252; H04J 14/0257; H04J 14/0282; H04J 2014/0241; H04J 2014/0242; H04J 2014/0253; H04Q 11/0067; H04Q 2011/0086
USPC ............................ 398/58, 67–72, 74, 75, 89
See application file for complete search history.

(56) References Cited

U.S. PATENT DOCUMENTS

| 7,583,669 | B2 * | 9/2009 | Yoo et al. ...................... 370/390 |
| 2008/0279554 | A1 * | 11/2008 | Kazawa et al. ................. 398/69 |
| 2011/0026926 | A1 * | 2/2011 | Yamashita ...................... 398/79 |
| 2011/0242974 | A1 * | 10/2011 | Das et al. ....................... 370/230 |
| 2014/0294391 | A1 * | 10/2014 | Tamaki et al. .................. 398/68 |

FOREIGN PATENT DOCUMENTS

JP   2011-004270 A   1/2011

* cited by examiner

*Primary Examiner* — Dalzid Singh
(74) *Attorney, Agent, or Firm* — Rabin & Berdo, P.C.

(57) ABSTRACT

In a telecommunications network including an optical line terminal (OLT) having optical subscriber units (OSUs) and an optical network unit (ONU) connected to the OLT, bandwidth allocation signals are periodically transmitted at a first period from the respective OSUs to the ONU, and an acknowledgement request signal is transmitted from at least one of the OSUs to the ONU at a second period having a value corresponding to the first period multiplied by a constant. If an ONU is registered in none of the OSUs, the first period is determined from reception intervals of the assignment signals, and a second period is calculated from the first period. Transmissive wavelength of a variable-wavelength (VW) filter in the ONU is periodically changed at a third period longer than the second period. In the OSU having transmitted the request signal, the unregistered ONU having received the request signal is registered.

15 Claims, 9 Drawing Sheets

| | Octets |
|---|---|
| Destination Address | 6 |
| Source Address | 6 |
| Length/Type = 0x8808 | 2 |
| Opcode = 0x0002 | 2 |
| Timestamp | 4 |
| Number of grants/Flags | 1 |
| Grant#1 Start time | 0/4 |
| Grant#1 Length | 0/2 |
| Grant#2 Start time | 0/4 |
| Grant#2 Length | 0/2 |
| Grant#3 Start time | 0/4 |
| Grant#3 Length | 0/2 |
| Grant#4 Start time | 0/4 |
| Grant#4 Length | 0/2 |
| Reserved/Pad | 15-39 |
| FCS | 4 |

METHOD FOR REGISTERING OPTICAL NETWORK UNIT IN TELECOMMUNICATIONS NETWORK AND OPTICAL NETWORK UNIT THEREFOR

BACKGROUND OF THE INVENTION

1. Field of the Invention

The present invention relates to a method of registering an unregistered optical network unit (ONU) in a telecommunications network. The present invention also relates to a telecommunications network comprising an optical line terminal (OLT) including a plurality of optical subscriber units (OSUs) and an ONU connected to the OLT. Furthermore, the present invention relates to an ONU for use in communication through a connection to an OLT.

2. Description of the Background Art

A telecommunications network which links a communication station possessed by a communication common carrier to customer premises may be called as an access network. In recent years, with the trend that communications capacities have increased, optical access networks enabling huge amounts of information to be transmitted by means of optical communications are becoming the mainstream of access networks.

As a form of optical access network, passive optical networks (PONs) are available. The PON is configured to have an OLT installed in a communication station, plural ONUs installed on respective subscriber premises and an optical splitter. The OLT and ONUs are interconnected to each other via the optical splitter with optical fiber lines.

The interconnection between an OLT and an optical splitter can be implemented by a single-core optical fiber, which is shared by plural ONUs. Optical splitters are, in general, inexpensive passive elements, so that PONs are superior in economics and in maintenanability. For those reasons, PONS are being rapidly introduced.

In a PON, signals transmitted by ONUs toward an OLT, which may be referred to as upstream optical signals, are first combined by an optical splitter and then transmitted to the OLT. On the contrary, signals transmitted by the OLT toward the ONUs, which may be referred to as downstream optical signals, are first split by the optical splitter and then transmitted to the respective ONUs. In order to prevent upstream and downstream optical signals from interfering with each other, the upstream and downstream optical signals are assigned to wavelengths that are different therebetween.

PONs are implemented by a variety of multiplexing techniques, such as time division multiplexing (TDM) assigning short time slots to subscriber terminals, wavelength division multiplexing (WDM) assigning different wavelengths specific to subscriber terminals, code division multiplexing (CDM) assigning different codes specific to subscriber terminals. In those multiplexing techniques, PONs based on the TDM, i.e. TDM-PON, currently enjoy the widest acceptance. Among TDM-PONs, time division multiple access (TDMA) is prevailing, in which an OLT manages timing at which ONUs transmit upstream optical signals so as to prevent upstream signals transmitted from the different ONUs from colliding with each other.

One of the PON systems based on Ethernet (trademark) may be referred to as Ethernet-PON, which includes a PON system based upon Gigabit ($1 \times 10^9$ bit/sec) Ethernet, that is, GE-PON. The GE-PON is standardized, for example, by IEEE (The Institute of Electrical and Electronics Engineers, Inc.) 802.3ah and IEEE 802.3av.

In order to establish communications between an OLT and ONUS in a GE-PON system, it is necessary to register the ONUS in the OLT. Generally in GE-PON systems, the single OLT has plural ONUS connected thereto. Thus, when an ONU not yet registered in the OLT is newly registered in the OLT, the registration has to be performed without affecting communications between the OLT and other ONUs already registered. For that aim, the IEEE 802.3ah and IEEE 802.3av Standards regulate a procedure of detecting an unregistered ONU and then registering that OLT. The procedure may be referred to as a discovery sequence.

In the discovery sequence, an OLT periodically broadcasts a discovery gate massage notifying all ONUS of transmitting timing. The discovery gate message is transmitted to every ONU, regardless of whether or not the ONU is already registered in the OLT. A time interval at which a discovery gate message is transmitted from the OLT may be referred to as a discovery period. After an ONU newly connected to the PON system, although not registered, is powered on and then prepared for reception of signals, it will periodically receive discovery gate messages.

If unregistered one of the ONUS receives a discovery gate message, it transmits a registration request to the OLT to request that the ONU be registered in the OLT. The registration request contains a media access control (MAC) address, which is the identification of the ONU.

In the OLT, a discovery window is set. The OLT opens a discovery window, in which it waits for reception of a registration request from an unregistered ONU.

The OLT receives a registration request to thereby recognize the MAC address of the unregistered ONU. The OLT in turn transmits a register message, which contains a logical link identifier (LLID) on the PON system, to the ONU having the recognized MAC address.

Subsequently to the transmission of the register message, the OLT transmits a gate message notifying the ONU of a transmission bandwidth and timing and allowing the ONU to transmit upstream optical signals.

On receiving the gate message, the unregistered ONU transmits a register acknowledgement (ACK) to the OLT. When the OLT receives the register ACK, registration of the new ONU is completed, namely, the discovery sequence thus finishes. After the new ONU is registered, normal communications between the OLT and the newly registered ONU will start.

At the present time, a PON system based upon both TDM and WDM, i.e. TDM/WDM-PON, is proposed. In the TDM/WDM-PON, an OLT may include a plurality of optical subscriber units (OSUs).

In the TDM/WDM-PON, OSUs are assigned to transmission wavelengths that are different OSU by OSU. The OSUs transmit downstream optical signals on the transmission wavelengths specifically assigned thereto. On the contrary, the ONUS transmit upstream optical signals on the transmission wavelengths and timing notified on the downstream optical signal by the OSU.

In the TDM/WDM-PON, ONUS are grouped correspondingly to plural OSUs so that each ONU is to be managed dedicatedly by either one of the plural OSUs, thus reducing the number of ONUs managed by each OSU. This can expand the service bandwidths provided to subscriber units.

In the TDM/WDM-PON thus configured, it is sufficient for each ONU to be registered in either one of the plural OSUs. Furthermore, as described previously, in the TDM/WDM-PON each ONU communicates at a wavelength appropriate for an OSU associated therewith. It is thus preferable for the ONUS to have the wavelengths thereof variably available for transmission and reception.

As disclosed in Japanese patent laid-open publication No. 2011-004270 to Fujiwara et al., an ONU in the TDM/WDM-PON includes a variable-wavelength (VW) filter. In this prior art system, the ONU, when unregistered, sweeps the passable, or transmissive, wavelength of its VW filter in order to wait for receipt of a discovery gate message.

When the unregistered ONU receives a downstream optical signal, it measures the optical power of the optical signal. When the measured optical power is less than a predetermined value, or threshold, the VW filter shifts its transmissive wavelength to a different wavelength.

On the contrary, when the measured optical power is equal to or greater than the predetermined value, the unregistered ONU makes a decision as to whether or not the downstream optical signal is a discovery gate message. If a discovery gate is detected in the optical signal, a discovery sequence will proceed as the processes described above.

If no discovery gate is detected, the ONU waits for receipt of a discovery gate message for a predetermined period of time, i.e. wait time. If no discovery gate message is received during the period of time, namely, the period of time is over, then the VW filter shifts its transmissive wavelength again to another different wavelength.

In the unregistered ONU, the VW filter repeats the shift of its transmissive wavelength until it receives a discovery gate message, thus searching for a transmissive wavelength on which it can receive a discovery gate message.

A wait time during which an unregistered ONU awaits a discovery gate message at a transmissive wavelength of its VW filter is set longer than a discovery period. That is, the wait time $T_{T\text{-}FL}$ of an unregistered ONU at each transmissive wavelength with respect to a discovery period $T_{DIS}$ is set by following Expression (1):

$$T_{T\text{-}FL} > T_{DIS} \quad (1)$$

The condition defined by Expression (1) ensures that a discovery gate message is sent at least once within the wait time at each transmissive wavelength. This makes it possible to correctly determine, at each transmissive wavelength set, whether or not a discovery gate message can be received. The VW filter thus sequentially, e.g. incrementally or decrementally, switches its transmissive wavelength, the unregistered ONU thereby being able to reliably receive a discovery gate message.

In the TDM/WDM-PON, the discovery period $T_{DIS}$ is usually set equal to a dynamic bandwidth allocation (DBA) period multiplied by a constant $\alpha$, where $\alpha$ is greater than unity. The DBA period is a period of time in which an OSU transmits a bandwidth allocation signal, such as a gate message in the aforementioned IEEE Standards, notifying an ONU of a transmission bandwidth and timing. The constant $\alpha$ is a value set in advance as a parameter during the operation of the system. Hence, when the DBA period is rendered to change, the discovery period $T_{DIS}$ is changed accordingly.

When the discovery period $T_{DIS}$ is varied, the wait time $T_{T\text{-}FL}$ of the unregistered ONU at each transmissive wavelength may become shorter than the discovery period $T_{DIS}$. In this case, a relation given by following Expression (2) is developed between the wait time $T_{T\text{-}FL}$ and the discovery period $T_{DIS}$:

$$T_{T\text{-}FL} < T_{DIS} \quad (2)$$

Under the condition given by above Expression (2), the transmissive wavelength of a VW filter is changed at a transmission interval at which a discovery gate message is sent. That may cause a condition to continue in which the wavelength of a discovery gate is not coincident with the transmissive wavelength of a VW filter. Consequently, it is highly likely that it takes a long time until a discovery sequence commences.

In order to maintain the condition defined by Expression (1) whenever the DBA period changes, the OSU would be adapted to notify the ONUS of the change of the DBA period. However, the ONU, when not activated, could not receive a notice of the change of the DBA period. Therefore, the ONU, when started up, would not set the wait time $T_{T\text{-}FL}$ appropriate for the change of the DBA period.

In order to maintain the relation given by Expression (1), a maximum assumption method would be introduced in which the possible maximum DBA period is considered so as to set the wait time $T_{T\text{-}FL}$ of an unregistered ONU at each transmissive wavelength. In the maximum assumption method, an unregistered ONU would calculate the discovery period $T_{DIS}$ on the basis of the maximum value of the DBA period. Then, the wait time $T_{T\text{-}FL}$ would be set so that Expression (1) could hold at the calculated discovery period $T_{DIS}$. Thence, if the DBA period is changed, the wait time $T_{T\text{-}FL}$ would be prevented from becoming shorter than the discovery period $T_{DIS}$. The relation given by Expression (1) would thus be maintained.

In the maximum assumption method, however, the wait time $T_{T\text{-}FL}$ would have to be set to a large value, which would require an extensive time until the wait time expires. Accordingly, when the DBA period is not maximal, if the wavelength of a discovery gate message is not coincident with the transmissive wavelength of the VW filter, it would then be highly likely that discovery gate messages the unregistered ONU fails to receive would repetitively be transmitted. For this reason, the unregistered ONU would inefficiently receive discovery gate messages, and hence it would take a long time until the discovery sequence is started and completed.

SUMMARY OF THE INVENTION

It is therefore an object of the present invention to provide an improved method of registering an unregistered optical network unit (ONU) in a telecommunications network. It is also an object of the invention to provide an improved telecommunications network capable of registering an unregistered ONU in an optical line terminal (OLT). Furthermore, it is also an object of the invention to provide an improved ONU connectable to such a telecommunications network.

In accordance with the present invention, a method of registering an ONU in a telecommunications network which includes an OLT having a plurality of OSUs and at least one ONU connected to the OLT, the ONU including a VW filter, the plurality of OSUs transmitting a signal having different wavelengths assigned to the respective OSUs, comprises steps of periodically transmitting by the plurality of OSUs a bandwidth allocation signal at a first period to each of the ONUS connected to the OLT; transmitting by at least one of the OSUs an acknowledgement request signal to the ONU at a second period having a value corresponding to the first period multiplied by a constant; determining by the unregistered ONU, if the ONU is registered in none of the OSUs, the first period for receiving the bandwidth allocation signals on the basis of reception intervals of the bandwidth allocation signals, and then calculating a second period on the basis of the first period; periodically changing by the unregistered ONU a transmissive wavelength of the VW filter in the unregistered ONU at a third period longer than the calculated second period; receiving the acknowledgement request signal by the unregistered ONU, and registering by the OSU having transmitted the acknowledgement request signal the unregistered ONU having received the acknowledgement request signal.

Also in accordance with the present invention, a telecommunications network comprises an OLT having a plurality of OSUs and at least one ONU connected to the OLT. The plurality of OSUs comprises a signal generator producing a bandwidth allocation signal for notifying the ONU of a transmission bandwidth of a signal to be transmitted from the ONU to the OLT; and an optical signal transmitter transmitting an optical signal containing the bandwidth allocation signal, different transmission wavelengths being assigned to the optical signals transmitted from the respective OSUs. The ONU comprises an optical signal receiver having a VW filter having a transmissive wavelength changeable to receive the optical signal having a transmission wavelength; a signal reader reading the bandwidth allocation signal contained in the received optical signal; a signal interval detector detecting a reception interval of the bandwidth allocation signal for determining a first period; a period calculator calculating a second period on the basis of the determined first period; and a VW filter controller periodically changing the transmissive wavelength of the VW filter at a third period longer than the calculated second period.

Further in accordance with the present invention, an ONU for use in communication through a connection to an OLT comprises: an optical signal receiver having a VW filter having a transmissive wavelength changeable to receive an optical signal having a transmission wavelength transmitted to the ONU; a signal reader reading a bandwidth allocation signal contained in the received optical signal, the bandwidth allocation signal notifying the ONU of a transmission bandwidth of a signal to be transmitted from the ONU to the OLT; a signal interval detector detecting a reception interval of the bandwidth allocation signal to determine a first period; a period calculator calculating a second period on the basis of the determined first period; and a VW filter controller periodically changing the transmissive wavelength of the VW filter at a third period longer than the calculated second period.

In accordance with the present invention, the wait time $T_{T-FL}$ satisfying the condition of above Expression (1) can be reliably set in the ONU.

Also in accordance with the present invention, the time taken until a timeout occurs in the ONU can be shortened so that the discovery sequence may be quickly started and completed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

The preferred embodiments of the present invention will be described with reference to the accompanying drawings. It is to be noted that the positional relationships between the constituent components are shown as simplified to the extent that the present invention can easily be understood. Also note that numerical values conditioned in the following preferred embodiments are merely exemplified. Accordingly, the present invention may not be restricted to the following specific embodiments.

One embodiment of a telecommunications network system according to the present invention may be implemented into an optical network system, more specifically to a TDM/WDM-PON, which is a PON system based upon both TDM and WDM and adapted for registering an ONU. Accordingly, the schematic configuration of the embodiment for use in the TDM/WDM-PON will first be described by referring to FIG. 1.

Figure 1:
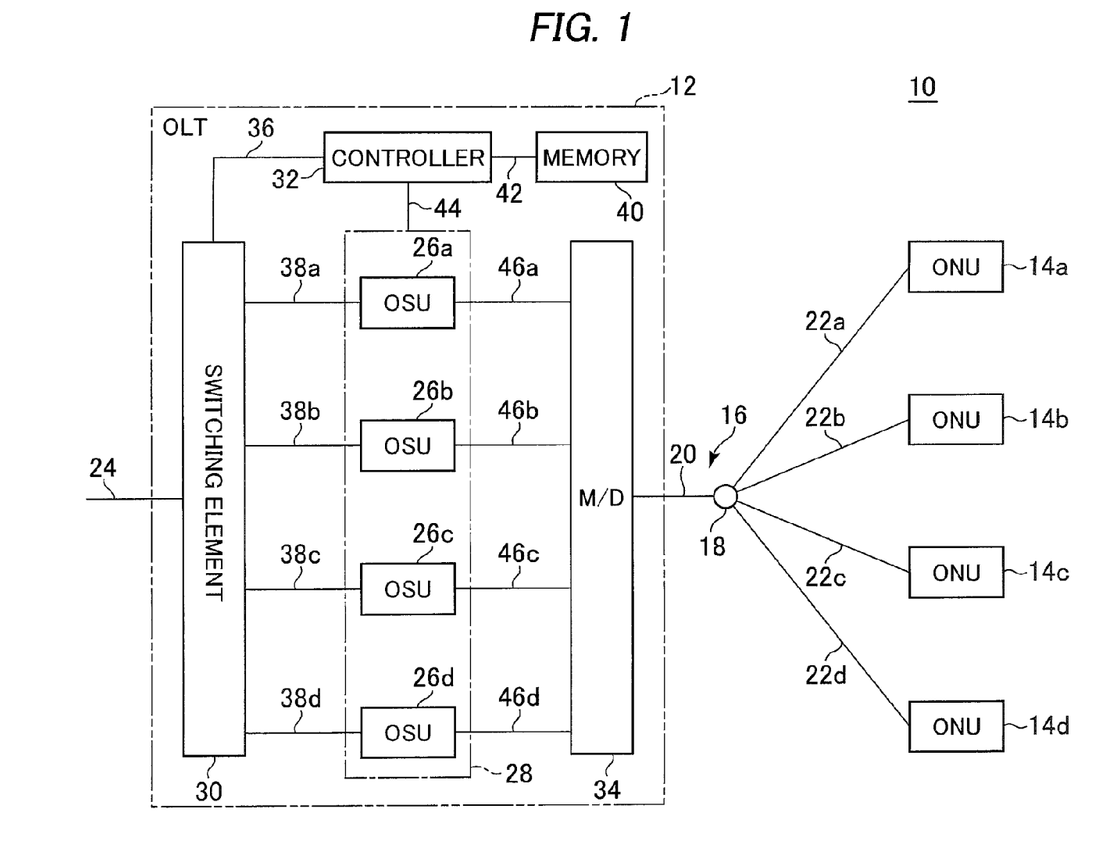
FIG. 1 is a schematic block diagram of a TDM/WDM-PON in accordance with a preferred embodiment of the present invention.

In the embodiment, a TDM/WDM-PON 10 based upon both TDM and WDM includes an optical line terminal (OLT) 12 and a plurality of ONUs 14. The TDM/WDM-PON 10 further includes an optical transmission channel 16 for optically connecting the OLT 12 to the respective ONUs 14.

The optical transmission channel 16 includes an optical splitter 18 for splitting a downstream optical signal and combining upstream optical signals. The optical transmission channel 16 includes an optical fiber line 20 connecting the OLT 12 to the optical splitter 18 and optical fiber lines 22a-22d connecting the splitter 18 to the ONUs 14a-14d, respectively.

The OLT 12 functions to produce a downstream optical signal including both a downstream data signal received from an upper or global layer network, not shown, and a downstream control signal for controlling operations of the ONUs 14 to transmit the produced optical signal to the ONUs 14. The OLT 12 is connected by a communication line 24 to the upper network.

The OLT 12 includes a plurality of optical subscriber units (OSUs) 26 for producing a downstream optical signal including both a downstream data signal received from the upper network and a downstream control signal for managing the ONUs 14 to transmit the produced signal to the ONUs 14. In FIG. 1, the plurality of OSUs 26 are also shown as a group 28 of OSUs 26a-26d for convenience.

The embodiment shown in FIG. 1 includes four ONUs 14a to 14d and four OSUs 26a to 26d. However, the number of the ONUs 14 and the OSUs 26 may not be limited to the specific value of the embodiment. In the illustrative embodiment, the ONUs 14a to 14d may be the same as each other and generally be designated just with a reference numeral 14. The OSUs 26a to 26d may also be the same as each other and generally be designated simply with a reference numeral 26. The configurations and functions of the ONUs 14 and OSUs 26 will be described in further detail later.

The OLT 12 further includes a switching element 30 for establishing a communication path between the upper network and the OSUs 26, and a controller 32 for controlling the OSUs 26. The OLT 12 also includes an M/D 34 adapted for multiplexing downstream optical signals of different wavelengths supplied from the OSUs 26 and demultiplexing an upstream combined optical signal received from the optical transmission channel 16. The M/D 34 is connected by the optical fiber line 20 to the optical splitter 18.

The ONU 14 is adapted to produce an upstream optical signal including both an upstream data signal received from a user terminal, not shown, connected to the ONU 14 and an upstream control signal for making a bandwidth request to send the produced optical signal toward the OSUs 26.

In the TDM/WDM-PON 10, the respective ONUs 14 may be registered in either one of the plurality of OSUs 26. Furthermore, the respective OSUs 26 are as signed to wavelengths different from each other. The OSUs 26 serve to transmit downstream optical signals on the assigned wavelengths. The OSUs 26 also serve to receive upstream optical signals on the assigned wavelengths.

One of the ONUs 14, when being registered in either one of the OSUs 26a to 26d, transmits an upstream optical signal on a wavelength which the one OSU 26 can accept. In order to prevent upstream optical signals transmitted from other ONUs 14 already registered in that one OSU 26 from overlapping with each other, the respective ONUs 14 registered in the identical OSU 26 are assigned to transmission timing different therebetween.

In the TDM/WDM-PON 10, as described earlier, the plurality of ONUs 14 may be grouped correspondingly to the plurality of OSUs 26a to 26d so that each ONU 14 is to be managed or controlled dedicatedly to either one of the plurality of ONUs 14. This reduces the number of ONUs 14 managed by each OSU 26, and hence the service bandwidths provided to respective subscribers can be expanded.

In the OLT 12, the switching element 30 is connected by the communication line 24 to the upper network to communicate with the upper network on the line 24. The switching element 30 is also connected by a connection line 36 to the controller 32 and by communication lines 38a-38d to the OSUs 26a-26d, respectively.

The switching element 30 is adapted to distribute downstream data signals to the OSUs 26a-26d on the basis of a transmission plan, described later, decided by the controller 32 to deliver the distributed signals to the destination OSUs 26. The switching element 30 is further adapted to transmit upstream data signals supplied from the OSUs 26a-26d to the upper network.

Furthermore, the switching element 30 functions to provide the controller 32 with information such as the destinations and traffic of the downstream data signals received from the upper network.

The controller 32 in the OLT 12 is adapted to manage information on the ONUs 14 registered in the OSUs 26, that is, PON link information. The controller 32 stores the PON link information in a memory 40 such as a random access memory which the PON link information can be read out from and written into. FIG. 1 shows that the memory 40 is connected by a connection line 42 to the controller 32. However, the memory 40 may be directly or indirectly connected to other constituent elements such as OSUs 36 and further may be included in the controller 32 per se.

The controller 32 is further adapted to decide a transmission plan of downstream signals on the basis of information received from the switching element 30, the PON link information and so on. The controller 32 may receive from the switching element 30 information such as the destination and traffic of downstream data signals.

The controller 32 communicates with the switching element 30 on the connection line 36 and the group 28 of OSUs on a connection line 44. The controller 32 may communicate individually with the respective OSUs 26a to 26d. Due to that configuration, the controller 32 can give a notice of a transmission plan to the switching element 30 and the OSUs 26.

Furthermore, the controller 32 is adapted to produce a wavelength assigning signal for assigning the OSUs 26a-26d to different wavelengths of downstream optical signals. The wavelength assigning signal is delivered to the OSUs 26 on the line 44. In the TDM/WDM-PON 10, as previously described, communications between the OSU 26 and the ONU 14 are performed on wavelengths specific thereto. Accordingly, the controller 32 is adapted to cause the OSUs 26 to conduct assignment of respectively different wavelengths of downstream optical signals.

In addition, the controller 32 is adapted to select, on the basis of a transmission plan, one of the OSUs 26 in which unregistered one of the ONUS 14a-14d is to newly be registered. The controller 32 in turn instructs that OSU 26 to produce a wavelength notice signal. The wavelength notice signal serves as instructing that ONU 14 such as to allow the ONU 14 to transmit upstream optical signals on a wavelength assigned to the OSU 26 to which the ONU 14 will perform a discovery sequence and to receive downstream optical signals on a wavelength assigned to the same OSU 26.

The M/D 34, which is connected by communication lines 46a-46d to OSUs 26a-26d, respectively, functions to multiplex downstream optical signals on different wavelengths fed from the OSUs 26 to transmit the multiplexed signal over the optical transmission channel 16 to the ONUS 14. The M/D 34 further functions to demultiplex upstream optical signals wavelength- and time-multiplexed by the optical splitter 18 into optical signals on respective wavelengths to transfer the demultiplexed signals to the OSUs 26 associated with the respective wavelengths.

Figure 2:
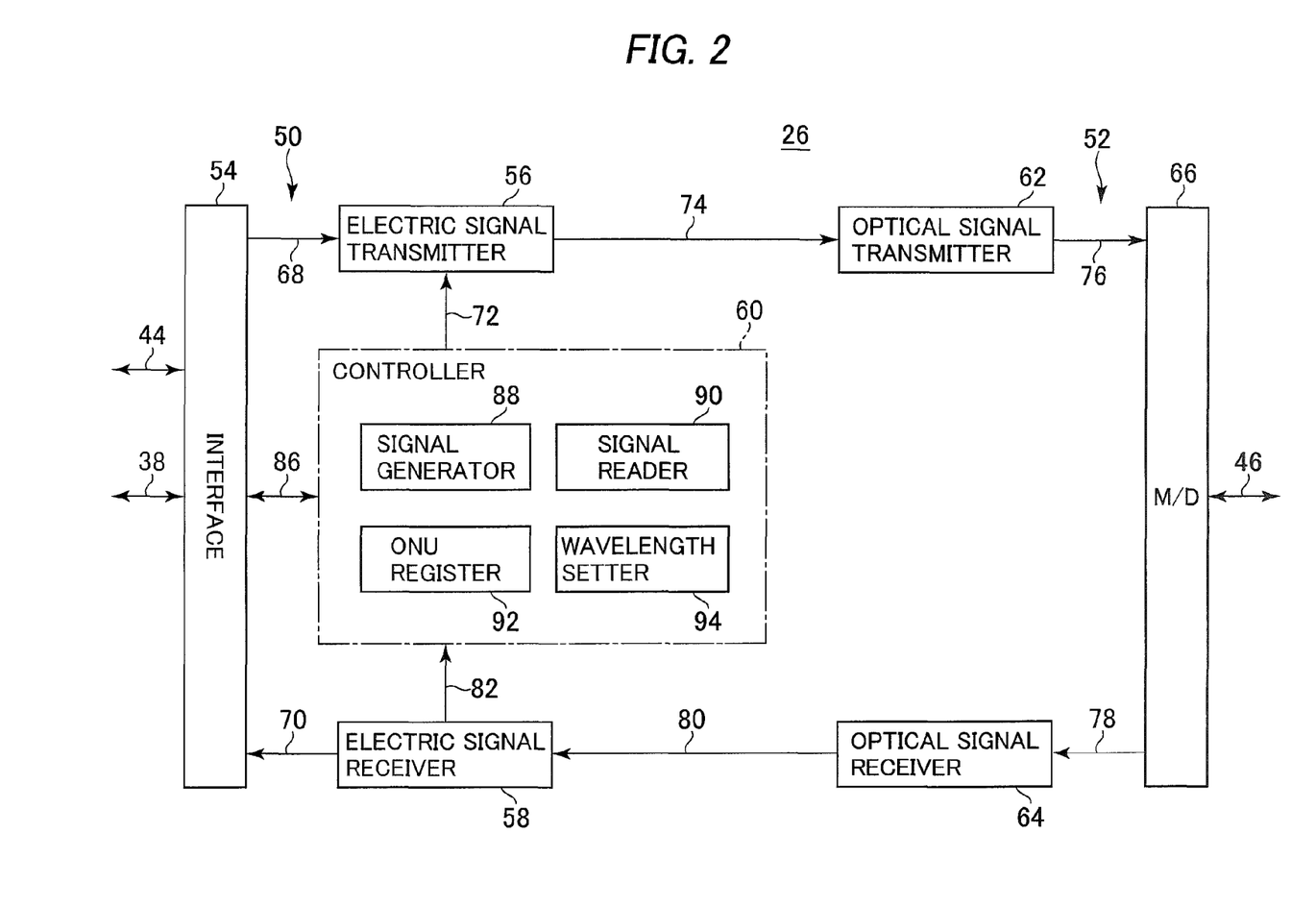
FIG. 2 is a schematic block diagram of an optical subscriber unit (OSU) in the embodiment shown in FIG. 1.

The configuration of the OSU 26 will be described with reference to FIG. 2. In the instant embodiment, the OSU 26 includes an electric signal processor 50 for processing electric signals and an optical signal processor 52 for processing optical signals.

The electric signal processor 50 includes an interface 54 for transmitting and receiving data signals to and from the upper network, an electric signal transmitter 56 for transmitting an electric signal to the optical signal processor 52, and an electric signal receiver 58 for receiving an electric signal from the optical signal processor 52. The electric signal processor 50 further includes a controller 60 for controlling the interface 54, the transmitter 56 and the receiver 58. The controller 60 may further control the optical signal processor 52.

The optical signal processor 52 includes an optical signal transmitter 62 for converting an electric signal received from the electric signal processor 50 to a corresponding optical signal to transmit the resultant optical signal to the ONU 14, and an optical signal receiver 64 for receiving an optical signal from the ONUs 14 to convert the optical signal to a corresponding electric signal. Thus, the optical signal transmitter 62 and the optical signal receiver 64 may be thought of as an electric-to-optical (E/O) converter 62 and an optical-to-electric (O/E) converter 64, respectively.

The optical signal processor 52 further includes an M/D 66 such as a WDM filter adapted for multiplexing and demultiplexing optical signal(s).

The interface 54, the electric signal transmitter 56 and the electric signal receiver 58 per se may be similar in structure to those of any conventional OLTs in PONS. Thus, a detailed description of the structure of those constituent elements is omitted.

The interface 54 is connected by the communication line 38 to the switching element 30. Due to that constitution, the interface 54 serves to transmit and receive upstream and downstream data signals to and from the upper network via the switching element 30. The interface 54 is also connected by the connection line 44 to the controller 32. The interface 54 further has its output 68 connected to an input of the electric signal transmitter 56 to transmit a downstream data signal received from the upper network to the transmitter 56. In addition, the interface 54 has its input 70 connected to an output of the electric signal receiver 58 to receive an upstream data signal from the receiver 58.

The electric signal transmitter 56 further has its input 72 connected to an output of the controller 60 and its output 74 connected to an input of the optical signal transmitter 62. The electrical signal transmitter 56 produces a downstream electrical signal from a downstream data signal received from the interface 54 in response to a downstream control signal received from the controller 60. The downstream electrical signal is delivered to the optical signal transmitter 62 on the line 74.

The optical signal transmitter 62 may include a tunable laser diode (TLD) that is adapted to vary the wavelength of an optical signal. The optical signal transmitter 62 converts a downstream electrical signal received from the electric signal transmitter 56 into a corresponding downstream optical signal. The optical signal transmitter 62 has its output 76 connected to an input of the M/D 66 to transmit the converted optical signal to the M/D 66.

The M/D 66 is connected by the communication line 46 to the M/D 34 in the OLT 12 to transmit a downstream optical signal produced by the optical signal transmitter 62 via the M/D 34 and the optical transmission channel 16 to the ONUs 14. Furthermore, the M/D 66 in the OSU 26 has its output 78 connected to an input of the optical signal receiver 64 to deliver an upstream optical signal received over the optical transmission channel 16 via the M/D 34 to the optical signal receiver 64.

In the TDM/WDM-PON 10, upstream optical signals are transmitted on wavelength bands that are different from those on which downstream optical signals are transmitted. By means of the difference in wavelength, upstream and downstream optical signals can be separated from each other by the M/D 66. Thus, upstream and downstream optical signals can be separately processed, i.e. multiplexed and demultiplexed by the M/D 66.

The optical signal receiver 64 includes an opto-electric conversion element such as a photodiode (PD). The optical signal receiver 64 functions as converting an upstream optical signal supplied from the M/D 66 on the communication line 78 into a corresponding upstream electrical signal. The photodiode is adapted to be able to receive upstream optical signals at least on wavelength bands which the ONUs 14a-14d can set up for communications with the OLT 12.

The optical signal receiver 64 is connected by a communication line 80 to the electrical signal receiver 58 to deliver the converted upstream electrical signals to the electric signal receiver 58.

The electric signal receiver 58 splits an upstream electrical signal received from the optical signal receiver 64 into an upstream data signal and an upstream control signal. The upstream data signal is sent out to the upper network via the interface 54 and the switching element 30.

The electric signal receiver 58 has its output 82 connected to an input of the controller 60 to deliver the upstream control signal produced by the receiver 58 to the controller 60.

The controller 60 may be similar in essential configuration to that used in any conventional OLTs in PONs. Thus, only the significant configuration and functions of the controller 60 will be described in detail.

The controller 60 is connected by a control line 86 to the interface 54 to intercommunicate with the interface 54. Furthermore, the controller 60 includes a signal generator 88 for producing a downstream control signal.

For example, the downstream control signal may be a bandwidth allocation signal, such as a gate signal, which is formed on the basis of a transmission plan decided by the controller 32 and bandwidth requests received from the ONUs 14 for notifying the ONUs 14 of a transmission bandwidth and transmission timing for upstream optical signals. The downstream control signal may also be a discovery gate message for use in a discovery sequence.

The downstream control signal contains information giving instructions on the transmission wavelength of upstream optical signals and the reception wavelength of downstream optical signals.

As already described, in the TDM/WDM-PON 10, each ONU 14 communicates with one of the OSUs 26 which has that ONU 14 registered on a wavelength specific thereto. For example, if the ONU 14a is registered in the OSU 26a, the ONU 14a communicates with the OSU 26a on a wavelength that is specific to the OSU 26a.

Thus, the controller 60 instructs the ONUS 14 by a downstream control signal so as to allow the ONUS 14 to send upstream optical signals on wavelengths respectively specific to the destination OSUs 26 and to receive downstream optical signals on wavelengths respectively specific to the source OSUs 26. The downstream control signal is first delivered to the electric signal transmitter 56 on the line 72.

The controller 60 includes a signal reader 90 for reading information on the ONUS 14 such as MAC addresses and requested bandwidths contained in the upstream control signal.

The controller 60 further includes an ONU register 92 for registering the ONUS 14 which are made communicable through a discovery sequence. The ONU register 92 is further adapted to give a notice of PON link information as to which ONUS 14 are registered in the OSUs 26 to the controller 32 via the interface 54. In other words, the ONU register 92 informs the controller 32 which one of the ONUS 14 a PON link has been established from the OSU 26 in which that ONU register 92 is involved. Of course, the ONU register 92 may inform the controller 32 of any information on the ONUS 14.

The controller 60 includes a wavelength setter 94 for setting the wavelength of a downstream optical signal produced in the optical signal transmitter 62 on the basis of a wavelength setting signal supplied from the controller 32.

The controller 60 may be adapted to serve, as a whole, as the signal generator 88, signal reader 90, ONU register 92 and wavelength setter 94. In that case, the controller 60 may be implemented by a computer on which program sequences stored in the memory 40 shown in FIG. 1 are run so as to produce downstream control signals, readout information on the ONUs 14, register the ONUs 14 and set the wavelengths of downstream optical signals. The results of processing by the program sequences performed on the controller 60 may be appropriately stored in the memory 40 or the like. In this regard, the illustrative embodiment of the controller 60 is depicted and described as configured by separate functional blocks, such as the signal generator 88. It is however to be noted that such a depiction and a description do not restrict those blocks to an implementation only in the form of hardware but may partially or entirely be implemented by software as described above. That may also be the case with illustrative embodiments which will be described below. In this connection, the word "circuit" or "unit" may be understood not only as hardware, such as an electronics circuit, but also as a function that may be implemented by software installed and executed on a computer.

Figure 3:
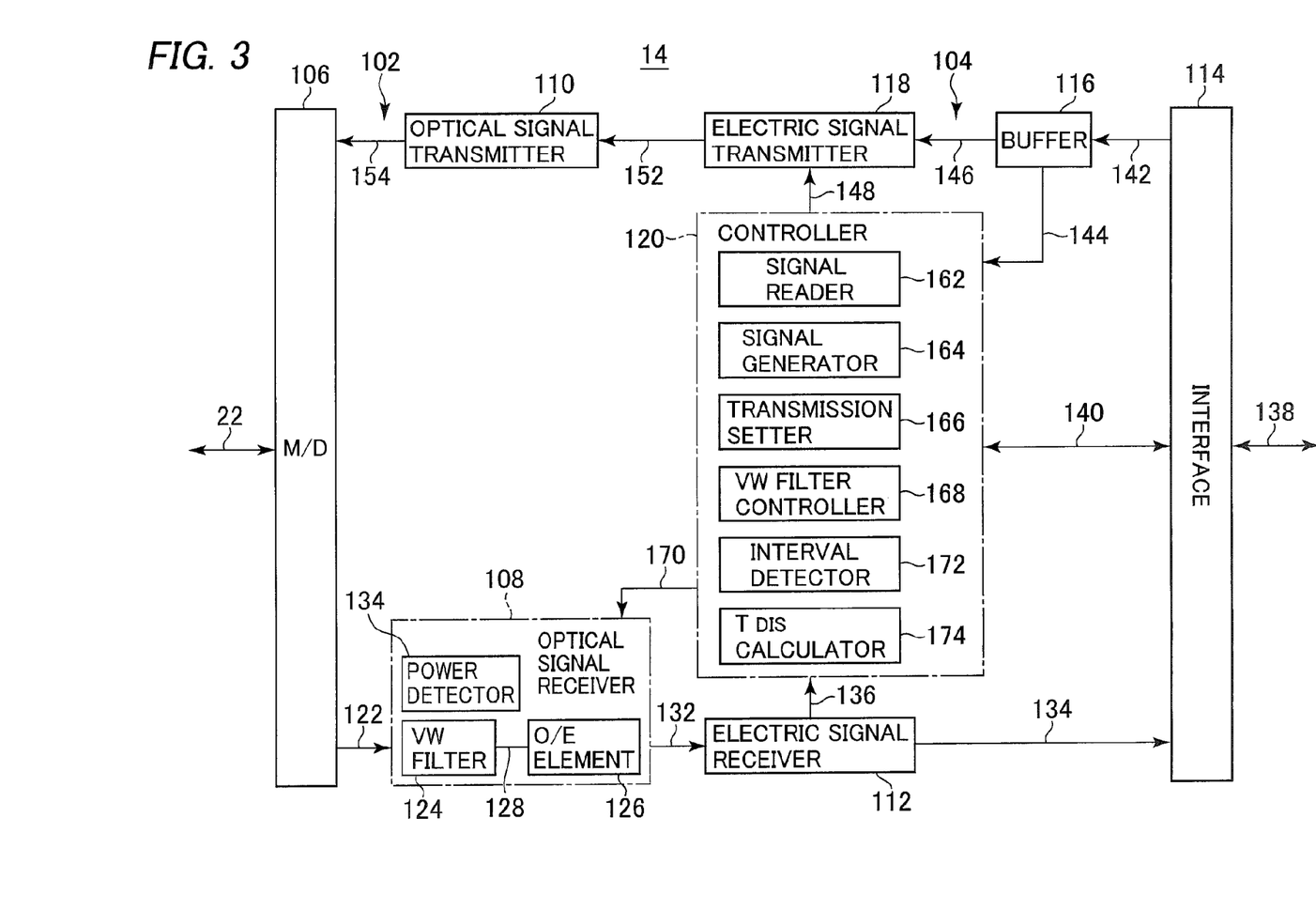
FIG. 3 is a schematic block diagram of an optical network unit (ONU) in the embodiment shown in FIG. 1.

Next, the configuration of each ONU 14 will be described by referring to FIG. 3. In the illustrative embodiment shown in FIG. 3, the ONU 14 includes an optical signal processor 102 for processing an optical signal and an electric signal processor 104 for processing an electric signal.

The optical signal processor 102 includes an M/D 106 for multiplexing and demultiplexing optical signal(s), an optical signal receiver 108 for receiving an optical signal from the OLT 12 to convert the optical signal to a corresponding electric signal, and an optical signal transmitter 110 for converting an electric signal processed by the electric signal processor 104 to a corresponding optical signal to transmit the converted optical signal to the OLT 12. Thus, the optical signal receiver 108 and the optical signal transmitter 110 may be thought of as an O/E converter 108 and an E/O converter 110, respectively.

The electric signal processor 104 includes an electric signal receiver 112 for receiving an electric signal from the optical signal receiver 108, an interface 114 for transmitting and receiving data signals to and from user terminals, not shown, a buffer 116, and an electric signal transmitter 118 for feeding an electric signal to the optical signal transmitter 110. The electric signal processor 104 further includes a controller 120 for controlling the receiver 112, the interface 114, the buffer 116 and the transmitter 118, and further the optical signal processor 102.

The electrical signal receiver 112, the interface 114, the buffer 116 and the electrical signal transmitter 118 and may be similar in configuration to those of conventional ONUs. Thus, a detailed description of the structure of those constituent units is omitted.

The M/D 106 may include any arbitrary type of multi/demultiplexer such as a WDM filter. The M/D 106 is connected by the optical fiber line 22 to the OLT 12 to receive an optical downstream signal from the OLT 12. As already described, in the TDM/WDM-PON, downstream and upstream optical signals are transmitted on optical bands that are different between downstream and upstream. By means of the difference in wavelength, upstream and downstream optical signals can be separated from each other by the M/D 106. Thus, upstream and downstream optical signals can be separately processed, i.e. multiplexed and demultiplexed by the M/D 106.

The M/D 106 has its output 122 connected to an input of the optical signal receiver 108 to transmit a downstream optical signal received from the OLT 12 to the optical signal receiver 108. The optical signal receiver 108 converts the downstream optical signal provided from the M/D 106 into a corresponding downstream electric signal.

The optical signal receiver 108 includes a VW filter 124. The VW filter 124 can variably or adaptively set its passable, or transmissive, wavelength for a downstream optical signal received by the optical signal receiver 108 according to the content of a notice provided from the controller 120. The downstream optical signal the optical signal receiver 108 receives is thus filtered by the VW filter 124 into the transmissive wavelength thus set. Namely, only the optical signal component having its wavelength matching with the transmissive wavelength set by the controller 120 is allowed to pass the filter 124. It will be described later in detail how the controller 120 controls the transmissive wavelength of the VW filter 124.

The optical signal receiver 108 also includes a opto-electric conversion element (O/E element) 126 such as a photodiode. The O/E element 126 is arranged so as to receive an optical signal passing the VW filter 124. For example, the VW filter 124 may have its output 128 connected to an input of the O/E element 126. The O/E element 126 is so arranged to be able to receive downstream optical signals at least on a wavelength band that is settable by the OSU 26. The O/E element 126 converts the downstream optical signal having passed the VW filter 124 into a corresponding downstream electric signal.

The optical signal receiver 108 is connected by a communication line 132 to the electric signal receiver 112. The downstream electric signal converted by the O/E element 126 is delivered to the electric signal receiver 112 on the line 132.

Furthermore, the optical signal receiver 108 may include a power detector 134 for measuring the optical power intensity of a downstream optical signal the receiver 108 has received.

The electrical signal receiver 112 separates the downstream electric signal thus received into a downstream data signal and a downstream control signal. The receiver 112 is connected by a communication line 134 to the interface 114 to transmit the downstream data signal to a user terminal via the interface 114. The receiver 112 is also connected by a communication line 136 to the controller 120 to transfer the downstream control signal to the controller 120.

The interface 114 functions as transmitting a downstream data signal to and receiving an upstream data signal from a user terminal, not shown, on a communication line 138 to thereby communicate with the user terminal. The interface 114 also communicates with the controller 120 on a communication line 140 to thereby be controlled by the controller 120.

The interface 114 is connected by a communication line 142 to the buffer 116. The buffer 116 receives an upstream data signal supplied from the user terminal via the interface 114 to temporarily store the received upstream data signal in the buffer 116.

The buffer 116 is connected by a communication line 144 to the controller 120. The buffer 116 also has its output 146 connected to an input of the electric signal transmitter 118. The buffer 116 gives a notice on the amount of data stored therein, i.e. buffering amount, to the controller 120. The buffer 114 reads out the stored upstream data signal in response to an instruction issued from the controller 120 to deliver the read-out upstream data signal to the electric signal transmitter 118.

The electrical signal transmitter 118 has its input 148 connected to an output of the controller 120 and its output 152 connected to an input of the optical signal transmitter 110. The electrical signal transmitter 118 produces an upstream electric signal from the upstream data signal received from the buffer 116 in response to an upstream control signal received from the controller 120. The transmitter 118 delivers the produced upstream electric signal to the optical signal transmitter 110.

The optical signal transmitter 110 converts the delivered upstream electric signal into a corresponding upstream optical signal. The optical signal transmitter 110 may include a TLD adapted to vary the wavelength of the converted optical signal. The wavelength of the upstream optical signal is set on the basis of on the content of a notice given from the controller 120.

The optical signal transmitter 110 has its output 154 connected to an input of the M/D 106. The upstream optical signal produced by the optical signal transmitter 110 is sent via the M/D 106 over the optical transmission channel 16 to the OSUs 26.

The controller 120 includes a signal reader 162 for reading information which is necessary to establish communication with the OSUs 26 and contained in a downstream control signal. The information read by the signal reader 162 may include instructions on the transmission bandwidth, transmission timing and transmission wavelength of an upstream optical signal and the reception wavelength of a downstream optical signal.

The controller 120 includes a signal generator 164 for producing an upstream control signal to inform the OSUs 26 of a buffering amount received from the buffer 116. The upstream control signal produced by the signal generator 164 is delivered to the electric signal transmitter 118 on the line 148.

The controller 120 includes a transmission setter 166 for setting conditions such as the wavelength, transmission timing and transmission wavelength of an upstream optical signal on the basis of information read by the signal reader 162, and giving instructions on the set conditions via the electric signal transmitter 118 to the optical signal transmitter 110.

The controller 120 includes a VW filter controller 168 for controlling the VW filter 124 to set and modify its transmissive wavelength. The controller 120 is connected by a communication line 170 to the optical signal receiver 108 so as to control the VW filter 124 in the receiver 108. The VW filter controller 168 can set the wait time $T_{T\text{-}FL}$ for a discovery gate message sent from the OSU 26 to thereby control timing at which the transmissive wavelength is to shift.

The controller 120 includes an interval detector 172 for detecting a time interval at which bandwidth allocation signals, such as gate messages, transmitted from the OSU 26 are received. As described previously, the period of bandwidth allocation signals corresponds to the dynamic bandwidth allocation (DBA) period. Therefore, the interval detector 172 can determine a DBA period on the basis of a detected interval at which the bandwidth allocation signals are received.

The controller 120 includes a discovery period calculator, or $T_{DIS}$ calculator, 174 adapted for calculating a discovery period $T_{DIS}$ by multiplying a DBA period by a constant α defined as a parameter as described earlier. If the controller 120 in one of the ONUS 14 which is not registered yet in any of the OSUs 26 is running, the controller 120 periodically varies the transmissive wavelength of its VW filter 124 on the basis of the discovery period $T_{DIS}$ calculated by the discovery period calculator 174 such that the wait time $T_{T\text{-}FL}$ at each transmissive wavelength of the filter 124 is rendered longer than the discovery period $T_{DIS}$, that is to say, such that above-mentioned Expression (1) becomes satisfied.

Now, in operation, an ONU will be registered in the following fashion, according to the present illustrative embodiment as applied to the standard discovery sequence described earlier.

The discovery sequence will start, for example, whenever unregistered one of ONUS 14 is connected to the optical network system. When an ONU 14 already registered in either of the OSUs 26a-26d is restarted, this ONU 14 is once deregistered and again to be registered through a discovery sequence.

In the instant illustrative embodiment, it is assumed that the OSUs 26a, 26b, 26c and 26d transmit downstream optical signals having wavelengths λ1, λ2, λ3 and λ4, respectively. The respective OSUs 26a to 26d periodically transmit bandwidth allocation signals, more specifically gate messages, at a DBA period that is common to every ONU 14. The allowable range within which DBA periods are settable by the OSUs 26 is preset at the onset of operation of the system, and is notified to the ONUS 14. At least one of the OSUs 26 transmits an acknowledgement request signal, which may be a discovery gate message in the present embodiment, toward every ONU 14 in a discovery period $T_{DIS}$, which is set to a times of the DBA period.

In the embodiment, the ONU 14, when registered in none of the OSUs 26, sequentially changes the transmissive wavelength of its VW filter 124 and adjusts the wait time $T_{T\text{-}FL}$ on each wavelength to thereby wait for a discovery gate message from the OSU 26.

Figure 4:
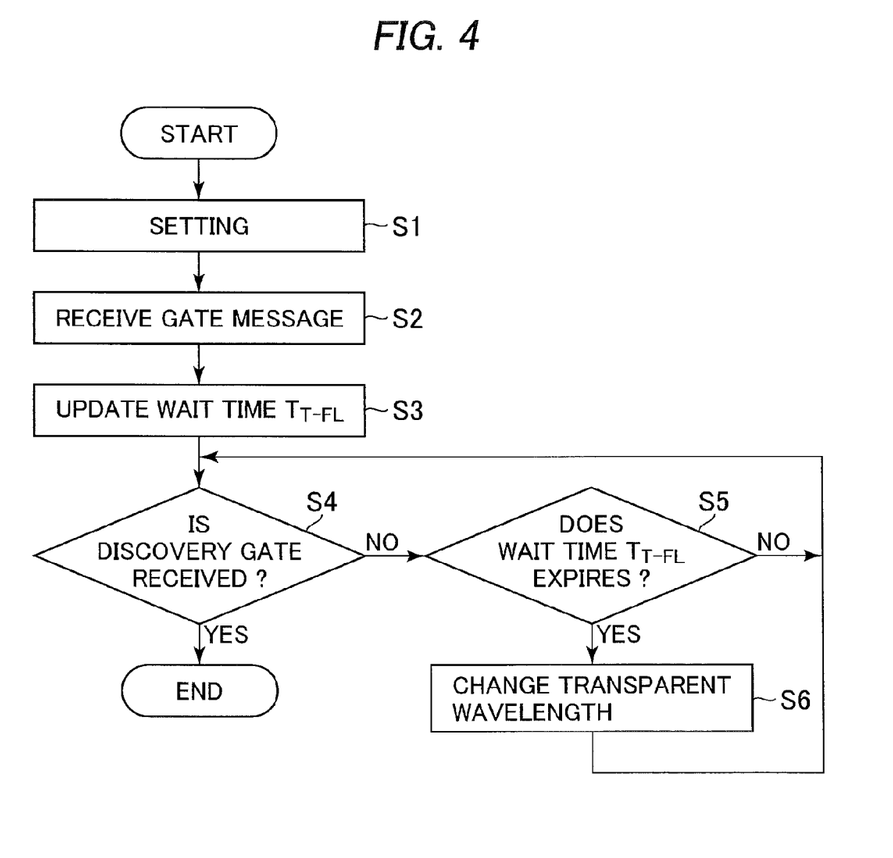
FIG. 4 is a flowchart useful for understanding how unregistered one of the ONUS shown in FIG. 1 operates when it is being registered.

Now, with reference to FIG. 4, the VW filter controller 168 in the unregistered ONU 14 first sets the transmissive wavelength of its VW filter 124 to a certain wavelength, which may or may not be predetermined, and has the wait time $T_{T\text{-}FL}$ set for a discovery gate message to be supplied from the OSU 26 (step S1).

The transmissive wavelength of the VW filter 124 is set according to an instruction notified from the VW filter controller 168. In the instant embodiment, the TDM/WDM-PON 10 includes the four OSUs, 26a to 26d, to which respectively different transmissive wavelengths λ1, λ2, λ3 and λ4 are assigned. Therefore, the transmissive wavelength of the VW filter 124 is set to either one of the wavelengths λ1, λ2, λ3 and λ4.

The discovery period calculator 174 in the unregistered ONU 14 in question multiplies the constant α by an arbitrary DBA period within the allowable range available for the TDM/WDM-PON 10 to thereby obtain a discovery period $T_{DIS}$ as an expected discovery period. Under the condition of Expression (1), i.e. $T_{T\text{-}FL} > T_{DIS}$, the wait time $T_{T\text{-}FL}$ is set larger than the expected discovery period $T_{DIS}$. As described previously, the constant α is a preset parameter, of which the ONUS 14 are informed.

The unregistered ONU 14 receives the gate message from the OSU 26 (step S2). As described previously, the respective OSUs 26a to 26d periodically transmit gate messages at the DBA period to every ONU 14. Accordingly, whichever the transmissive wavelength of the VW filter 124 is set in step S1 among the wavelengths λ1, λ2, λ3 and λ4, the unregistered ONU 14 can receive a gate message through the VW filter 124.

Figure 5:
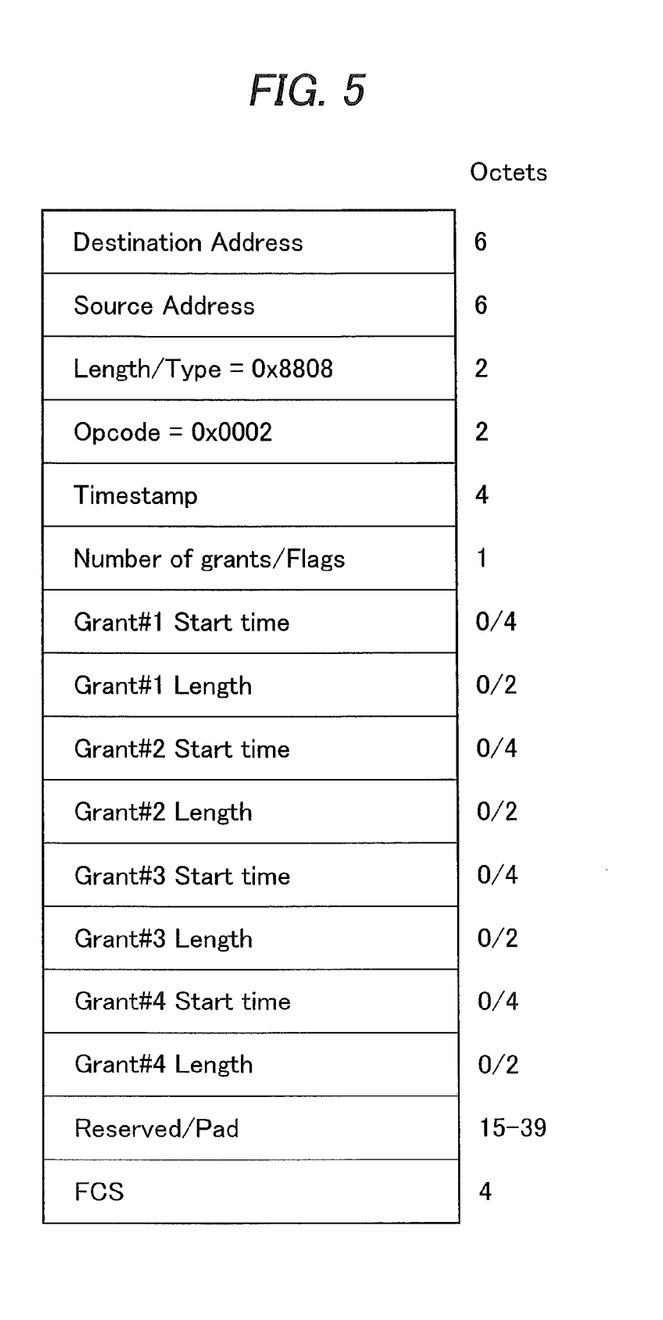
FIG. 5 schematically shows an example of frames of a gate message.

FIG. 5 shows the frame configuration of a gate message stipulated in IEEE 802.3av described earlier. In the figure, as with a general format for use in showing frames, numerals shown rightward the respective fields indicate the amount of information applied to the corresponding fields in octets. For example, the notation "0/4" shown on the right side of the fields "Grant#1 Start time" through "Grant#4 Start time" indicates that 0 or 4 octets can be applied to the fields. Such is the case with the notation "0/2" on the right side of the fields "Grant#1 length" through "Grant#4 Length". In this embodiment, the amount of information of the field "Reserved/Pad" is between 15 and 39 octets, inclusive.

Types of frame are distinguishable by operation codes (Opcodes). The gate message is identified by the field "Opcode=0x0002". When the unregistered ONU 14 receives a gate message, the signal reader 162 in the unregistered ONU 14 reads the field on the opcode contained in the gate message to recognize a reception of the gate message.

The discovery period $T_{DIS}$ is usually set to, for example, about 100 times as long as the DBA period. That is to say, the constant α turns out to be 100. As previously described, the unregistered ONU 14 sets the wait time $T_{T-FL}$ to a value larger than the expected discovery period $T_{DIS}$. The unregistered ONU 14 may thus receive two or more gate messages on the transmissive wavelength of the VW filter 124 set in step S1 within the wait time $T_{T-FL}$.

Then, the unregistered ONU 14 updates the wait time $T_{T-FL}$ (step S3). Because the unregistered ONU 14 may receive two or more gate messages in step S2, the interval detector 172 can measure an interval, at which gate messages are received, as a DBA period. The discovery period calculator 174 multiplies the DBA period by the constant α to thereby be able to calculate and determine the discovery period $T_{DIS}$.

The VW filter controller 168 or the like in the unregistered ONU 14 updates the wait time $T_{T-FL}$ on the basis of the determined discovery period $T_{DIS}$. In case where the wait time $T_{T-FL}$ set in step S1 is shorter than the determined discovery period $T_{DIS}$, the wait time $T_{T-FL}$ is modified so that it becomes longer than the discovery period $T_{DIS}$ so as to satisfy the condition given by Expression (1).

On the contrary, even when the wait time $T_{T-FL}$ set in step S1 is longer than the determined discovery period $T_{DIS}$, the wait time $T_{T-FL}$ is modified to its minimum value within a possible range dependent upon the accuracy in reception of the ONU 14 to the extent that the condition of Expression (1) becomes satisfied.

After updating the wait time $T_{T-FL}$ in step S3, the unregistered ONU 14 waits for a discovery gate message while periodically changing the transmissive wavelength of the VW filter 124 per the updated wait time $T_{T-FL}$. The waiting for a discovery gate message will be described below.

When the DBA period, which is a time interval in which bandwidth allocation signals can be received, is modified during waiting for an acknowledgement request signal such as discovery gate message, the unregistered ONU 14 updates the wait time $T_{T-FL}$ again on the basis of the modified DBA period.

The signal reader 162 in the unregistered ONU 14 makes a determination as to whether or not the ONU 14 receives a discovery gate message (step S4).

If the signal reader 162 determines that the ONU 14 receives a discovery gate message (Yes, in step S4), the unregistered ONU 14 will conduct a discovery sequence, described previously, with either one of the OSUs 26a to 26d which is indicated during the discovery sequence. Thus, subsequent, normal operation for registering the unregistered ONU 14 in the OLT 12 will be performed.

On the contrary, if the signal reader 162 of the ONU 14 fails to receive a discovery gate message, the control advances to step S5 in which the ONU 14 stands by without proceeding to a discovery sequence, and passes the loop of steps S4 and S5 until the wait time $T_{T-FL}$ updated in step S3 expires.

More specifically, the controller 120 in the unregistered ONU 14 makes a decision, in step S5, as to whether or not the wait time $T_{T-FL}$ expires. If the controller 120 determines that the wait time $T_{T-FL}$ has not yet expired (No, in step S4), the registering control goes back to step S4. Thus, the signal reader 162 will proceed again to the decision loop, steps S4 and S5, to await reception of a discovery gate message.

If the controller 120 determines that the wait time $T_{T-FL}$ expires (Yes, in step S4), the VW filter controller 168 changes and sets the transmissive wavelength of the VW filter 124 to a different wavelength (step S6). In this embodiment, the transmissive wavelength is sequentially changed whenever the wait time $T_{T-FL}$ has expired without receiving any discovery sequence. More specifically, the transmissive wavelength of the VW filter 124 may be changed in the order of λ1, λ2, λ3 and λ4. After having changed the transmissive wavelength of the VW filter 124, the registering control goes back to step S4. Thus, the signal reader 162 will again proceed to making a determination on reception of a discovery gate message.

As described so far, in the instant embodiment according to the present invention, the unregistered ONU 14 may calculate and determine the discovery period $T_{DIS}$, on the basis of the interval at which bandwidth allocation signals can be received. Therefore, the ONU 14 can reliably set the wait time $T_{T-FL}$ which satisfies the condition given by Expression (1).

Furthermore, because the ONU 14 in the present embodiment is adapted to calculate the discovery period $T_{DIS}$, the wait time $T_{T-FL}$ can be set to its possible minimum value while satisfying the condition given by Expression (1). Consequently, it can take a shortened period of time until it is timed out while the wavelength of a discovery gate message remains inconsistent with the transmissive wavelength of the VW filter 124. As a result, the discovery sequence can be started and completed in a shorter time.

In the TDM/WDM-PON 10, there may be a time when one or more of the OSUs 26a to 26d is/are not in operation. Under the circumstances, it is possible that the transmissive wavelength of the VW filter 124 is set in step S1 to a transmission wavelength that has already been allotted to one of the OSUs 26 that is not in operation. In this case, the unregistered ONU 14 cannot receive a bandwidth allocation signal in step S2. Accordingly, the system is adapted such that the ONU 14 may skip steps S2 and S3 to transfer to step S4 whenever the unregistered ONU 14 fails to receive in step S2 a bandwidth allocation signal from the OSU 26 within the wait time $T_{T-FL}$. When the ONU 14 receives a bandwidth allocation signal during a period of waiting for receipt of an acknowledge request signal in steps S4-S6, the ONU 14 may change the wait time $T_{T-FL}$.

Figure 6:
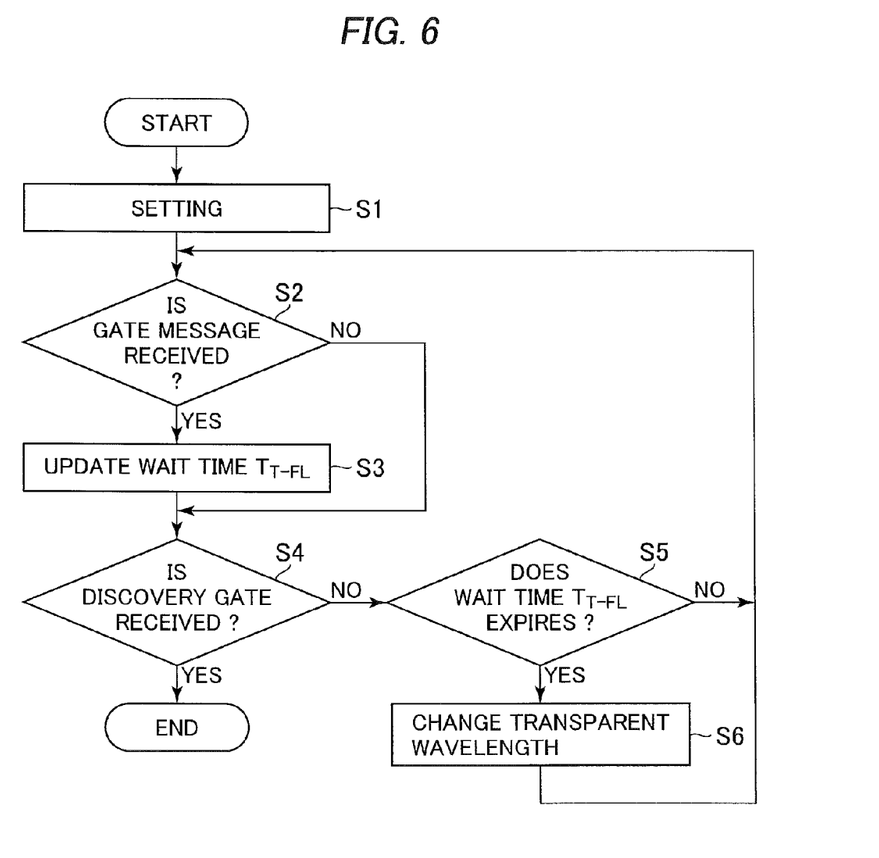
FIG. 6 is a flowchart useful for understanding an alternative operation of the unregistered ONU when being registered.

FIG. 6 shows a control flow in which the ONU 14 waits for receipt of an acknowledge request signal such as a discovery gate message, regardless of receipt of a bandwidth allocation signal such as a gate message. In the flowchart, step S2 is changed to as a decision step. Furthermore, according to the flowchart, the control is modified such that the waiting operations of an acknowledge request signal shown as steps S4-S6 may be performed while awaiting receipt of a gate message.

In the embodiment in which the optical signal receiver 162 includes the power detector 134, the system may be adapted such that, the transmissive wavelength of the VW filter 124 may be changed even sufficiently before the wait time $T_{T-FL}$ set in step S1 expires when the optical signal receiver 108 fails to receive a gate message during a predetermined period of time in step S2, for example, when the power detector 134 cannot sense any optical power intensity in a predetermined period of time.

In one instance, the predetermined period of time is preferably equal to the maximum value of a DBA period applicable to the OSU 26. If the unregistered ONU 14 receives no gate message on a transmissive wavelength until the maximum time of the DBA period expires, more specifically, if the power detector 134 cannot sense any significant optical intensity, it may be expected that the OSU 26 to which a transmission wavelength coincident with the transmissive wavelength is assigned would not be in operation. Accordingly, once it is determined that no gate message was received during the period corresponding to the maximum value of the DBA period, the OSU 26 thus determined inactive changes the transmissive wavelength, whereby the wait time for the unregistered ONU 14 can be shortened.

Figure 7:
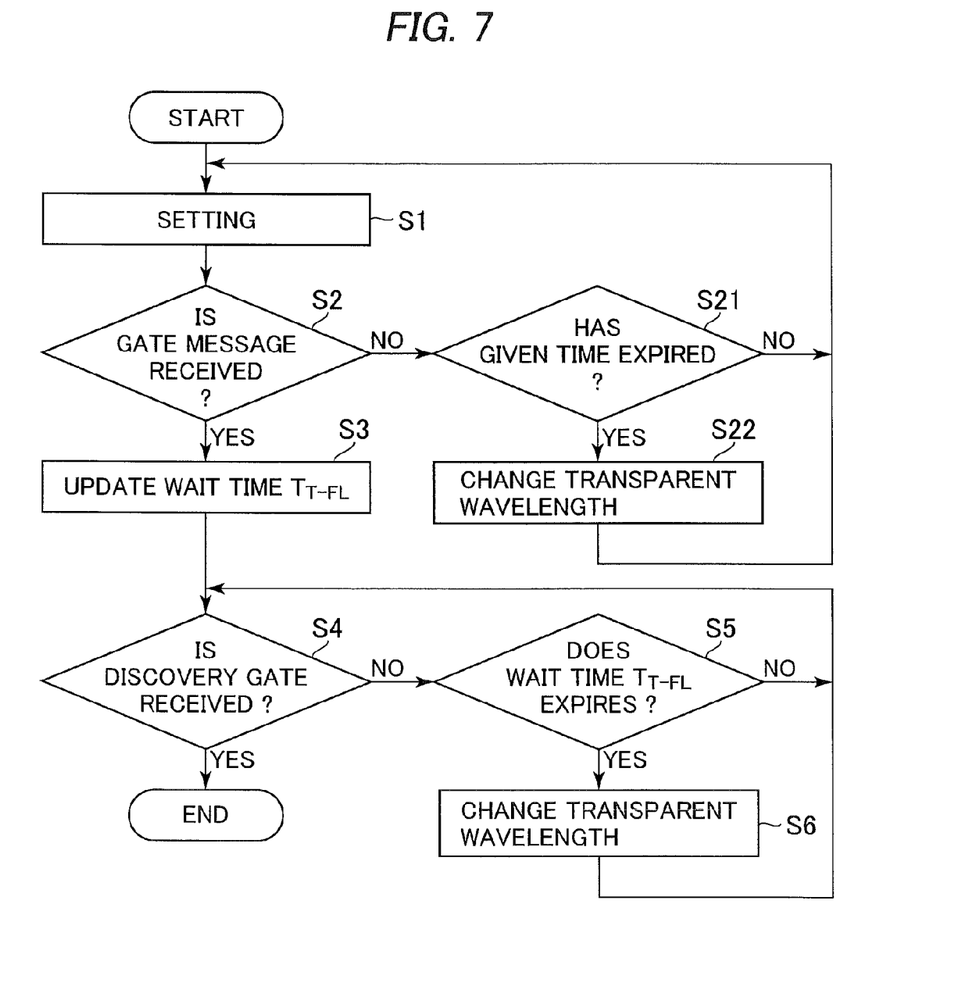
FIG. 7 is a flowchart useful for understanding a further alternative operation of the unregistered ONU when being registered.

FIG. 7 is a flowchart for use in understanding an operation in which, when the ONU 14 does not receive any gate message within the predetermined time (step S21), the VW filter controller 168 immediately changes the transmissive wavelength of the VW filter 124 (step S22).

Alternatively, the system may be adapted such that the wait time for receiving a gate message from the inactive OSU 26 in step S22 may be set to twice as much as the maximum value of the DBA period applicable to the OSU 26. The ONU 14 can thus determine with more precision that the OSU 26 associated with the selected transmissive wavelength of the VW filter 124 is inactive because the transmissive wavelength of the VW filter 124 is changed only in a case where a gate message is not detected in two successive DBA periods. Of course, the wait time for receiving a gate message may be arbitrarily set in terms of quick reception and precise detection of a gate message.

In the illustrative embodiment, when the wait time $T_{T-FL}$ is set in the way described above, it will be described by referring to FIG. 8 how a sequence of operations proceeds until the unregistered ONU 14 receives a discovery gate message.

Figure 8:
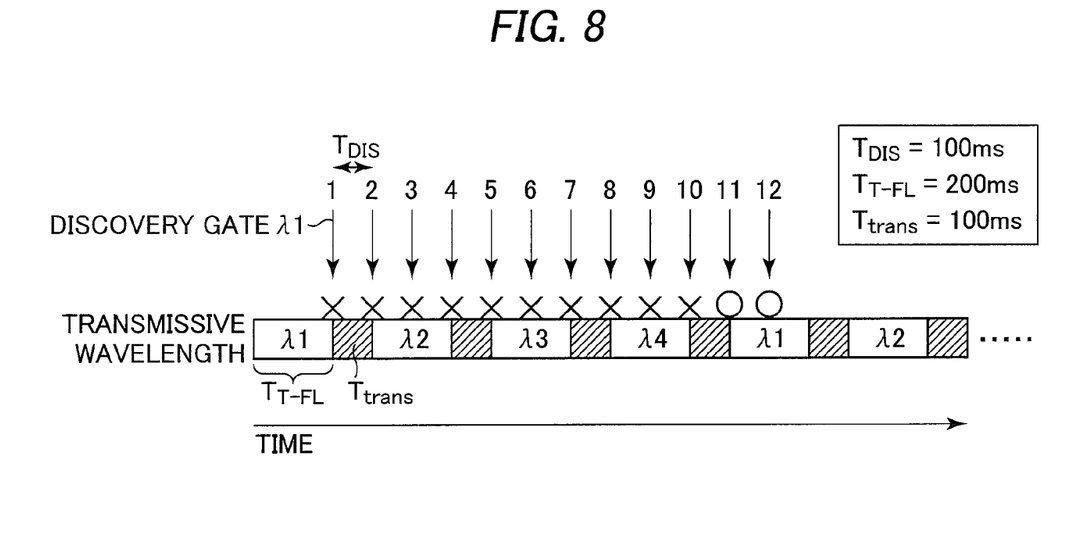
FIG. 8 is a time chart showing temporal changes of transmissive wavelengths until the unregistered ONU receives a discovery gate message in the embodiments.

For illustration, the OSU 26a now sends a discovery gate message on wavelength λ1 in the discovery period $T_{DIS}$ of 100 ms, for example. Unregistered one of the ONUs 14 performs steps S2 and S3 after the transmissive wavelength is set to the wavelength λ1 subsequently to the startup of the ONU 14, and the wait time $T_{T-FL}$ is set to 200 ms to satisfy the condition given by Expression (1).

The unregistered ONU 14 further waits for a discovery gate message while changing the transmissive wavelength of the VW filter 124 to λ1, λ2, λ3 and λ4 in turn in steps S4-S6 described above. For changing the transmissive wavelength of the VW filter 124, it takes a wavelength conversion time $T_{trans}$ of 100 ms, for example.

In the embodiment shown in FIG. 8, the worst condition is assumed, under which at the moment that the wavelength is changed from λ1 to λ2 after the unregistered ONU 14 is booted up, the first discovery gate message is transmitted.

The number N of transmissions of discovery gate messages, required until the unregistered ONU 14 can receive as shown in FIG. 8, may be given by following Expression (3):

$$N = \{T_{T-FL} \times (n_\lambda - 1) + T_{trans} \times (n\lambda)\}/T_{DIS} + 1 \quad (3),$$

where the term $n_\lambda$ is the number of transmissive wavelengths that are set when the VW filter 124 operates to sweep the transmission wavelength of downstream optical signals. In the present embodiment, the term $n_\lambda$ is equal to "4" because four wavelengths λ1, λ2, λ3 and λ4 are set as the transmissive wavelengths of the VW filter 124.

In the present embodiment, when the 11th discovery gate message is transmitted to the unregistered ONU 14, the ONU 14 in which the transmissive wavelength of the VW filter 124 is set to λ1 may receive the discovery gate message. Accordingly, it takes 1100 ms at the maximum until the unregistered ONU 14 receives the discovery gate message.

In comparison, a sequence of operations performed until the unregistered ONU 14 receives a discovery gate message in a case where the wait time $T_{T-FL}$ is set using the earlier-described conventional maximum assumption method will be described by referring to FIG. 9.

It is now assumed that the range of a set value of the DBA period is 1 to 10 ms and that the constant α is 100. Thus, possible values of the discovery period $T_{DIS}$ may be 100 to 1000 ms. It is also assumed that the unregistered ONU 14 sets the wait time $T_{T-FL}$ to 2000 ms on the basis of the maximum value (1000 ms) of the discovery period $T_{DIS}$.

Figure 9:
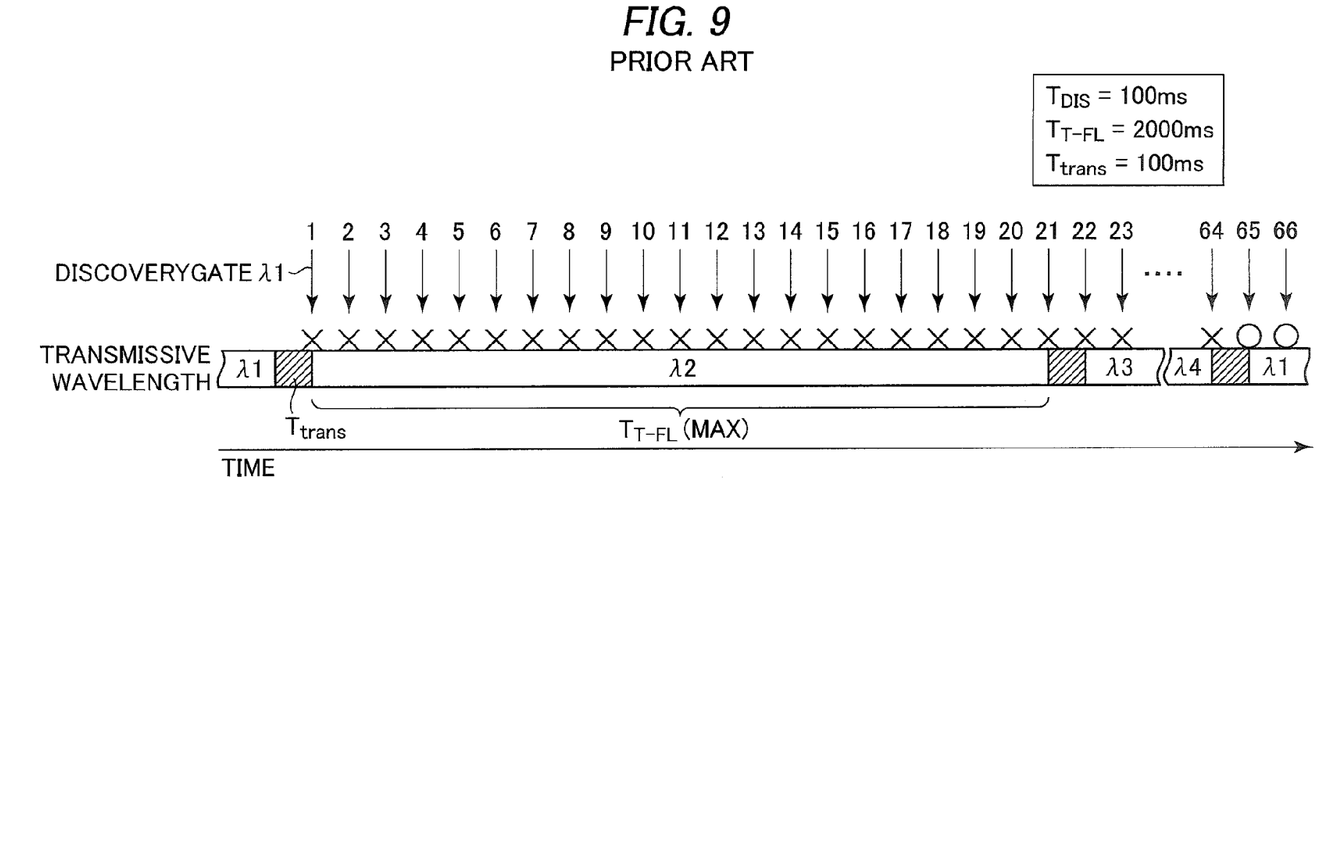
FIG. 9 is also a time chart, like FIG. 8, showing temporal changes of transmissive wavelengths until an unregistered ONU receives a discovery gate message according to a conventional maximum assumption method.

The remaining in this example shown in FIG. 9 are similar to those shown in FIG. 8. It is then derived from Expression (3) in the maximum assumption method that the unregistered ONU 14 would receive the 65th discovery gate message. Accordingly, it takes 6500 ms at the maximum until the unregistered ONU 14 receives the discovery gate message.

As can be definite from above, with the illustrative embodiment of the present invention, since the wait time $T_{T-FL}$ is set in the way described so far, it takes much shorter time until a discovery gate message is received than with the conventional maximum assumption method.

The entire disclosure of Japanese patent application No. 2013-054815 filed on Mar. 18, 2013, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention to accomplish the advantages described so rat.

What is claimed is:

1. A method of registering an unregistered optical network unit (ONU) in a telecommunications network which comprises an optical line terminal (OLT) including a plurality of optical subscriber units (OSUs) and at least one ONU connected to the OLT, the ONU including a variable-wavelength (VW) filter, the plurality of OSUs transmitting a signal on different wavelengths specifically assigned to the respective OSUs, said method comprising:
   periodically transmitting by the plurality of OSUs a bandwidth allocation signal at a first period to each of the ONUs connected to the OLT;
   transmitting by at least one of the OSUs an acknowledgement request signal to the ONU at a second period having a value corresponding to the first period multiplied by a constant;
   determining by the unregistered ONU, if the ONU is registered in none of the OSUs, the first period for receiving the bandwidth allocation signal on a basis of a reception interval of the bandwidth allocation signal, and then calculating the second period on the basis of the first period;
   periodically changing by the unregistered ONU a transmissive wavelength of the VW filter in the unregistered ONU at a third period longer than the calculated second period;
   receiving the acknowledgement request signal by the unregistered ONU; and
   registering by the OSU having transmitted the acknowledgement request signal the unregistered ONU having received the acknowledgement request signal.

2. The method in accordance with claim 1, wherein the unregistered ONU waits for the bandwidth allocation signal while sequentially changing the transmissive wavelength of the VW filter.

3. The method in accordance with claim 1, wherein, when the unregistered ONU receives no bandwidth allocation signal within a predetermined period of time, the unregistered ONU changes the transmissive wavelength of the VW filter.

4. The method in accordance with claim 3, wherein, when the unregistered ONU receives no bandwidth allocation signal within a period of time that is substantially equal to a maximum value of the first period, the unregistered ONU changes the transmissive wavelength of the VW filter.

5. The method in accordance with claim 3, wherein, when the unregistered ONU receives no bandwidth allocation signal within a period of time twice as much as the maximum value, the unregistered ONU changes the transmissive wavelength of the VW filter.

6. A telecommunications network comprising an optical line terminal (OLT) including a plurality of optical subscriber units (OSUs) and at least one optical network unit (ONU) connected to said OLT, wherein said plurality of OSUs comprise a signal generator producing a bandwidth allocation signal for notifying said ONU of a transmission bandwidth of a signal to be transmitted from said ONU to said OLT; and an optical signal transmitter transmitting an optical signal containing the bandwidth allocation signal, different transmission wavelengths being assigned to the optical signals transmitted from said respective OSUs, said ONU comprising:

an optical signal receiver including a variable-wavelength (VW) filter having a transmissive wavelength changeable to receive the optical signal having a transmission wavelength;

a signal reader reading the bandwidth allocation signal contained in the received optical signal;

a signal interval detector detecting a reception interval of the bandwidth allocation signal for determining a first period;

a period calculator calculating a second period on a basis of the determined first period; and a VW filter controller periodically changing the transmissive wavelength of said VW filter at a third period longer than the calculated second period.

7. The network in accordance with claim 6, wherein said VW filter controller controls said VW filter so as to sequentially change the transmissive wavelength of said VW filter.

8. The network in accordance with claim 6, wherein, when said signal reader does not receive the bandwidth allocation signal within a predetermined period of time, said VW filter controller controls said VW filter to change the transmissive wavelength of said VW filter.

9. The network in accordance with claim 8, wherein, when said signal reader receives no bandwidth allocation signal within a period of time that is substantially equal to a maximum value of the first period, said VW filter controller controls said VW filter to change the transmissive wavelength of said VW filter.

10. The network in accordance with claim 8, wherein, when said signal reader receives no bandwidth allocation signal within a period of time twice as much as the maximum value, said VW filter controller controls said VW filter to change the transmissive wavelength of said VW filter.

11. An optical network unit (ONU) for use in network communication through a connection to an optical line terminal (OLT), comprising:

an optical signal receiver including a variable-wavelength (VW) filter having a transmissive wavelength changeable to receive an optical signal having a transmission wavelength transmitted to said ONU;

a signal reader reading a bandwidth allocation signal contained in the received optical signal, the bandwidth allocation signal notifying said ONU of a transmission bandwidth of a signal to be transmitted from said ONU to the OLT;

a signal interval detector detecting a reception interval of the bandwidth allocation signal to determine a first period;

a period calculator calculating a second period on a basis of the determined first period; and a VW filter controller periodically changing the transmissive wavelength of said VW filter at a third period longer than the calculated second period.

12. The ONU in accordance with claim 11, wherein said VW filter controller controls said VW filter so as to sequentially change the transmissive wavelength of said VW filter.

13. The ONU in accordance with claim 11, wherein, when said signal reader does not receive the bandwidth allocation signal within a predetermined period of time, said VW filter controller controls said VW filter to change the transmissive wavelength of said VW filter.

14. The ONU in accordance with claim 13, wherein, when said signal reader receives no bandwidth allocation signal within a period of time that is substantially equal to a maximum value of the first period, said VW filter controller controls said VW filter to change the transmissive wavelength of said VW filter.

15. The GNU in accordance with claim 13, wherein, when said signal reader receives no bandwidth allocation signal within a period of time twice as much as the maximum value, said VW filter controller controls said VW filter to change the transmissive wavelength of said VW filter.

* * * * *